US009914832B2

(12) United States Patent
Lehenmeier et al.

(10) Patent No.: US 9,914,832 B2
(45) Date of Patent: *Mar. 13, 2018

(54) ARTICLES PRODUCED BY THERMOFORMING

(71) Applicant: BASF SE, Ludwigshafen (DE)

(72) Inventors: Maximilian Lehenmeier, Heidelberg (DE); Gabriel Skupin, Speyer (DE); Martin Bussmann, Beindersheim (DE)

(73) Assignee: BASF SE (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/309,711

(22) PCT Filed: Apr. 29, 2015

(86) PCT No.: PCT/EP2015/059301
§ 371 (c)(1),
(2) Date: Nov. 8, 2016

(87) PCT Pub. No.: WO2015/169659
PCT Pub. Date: Nov. 12, 2015

(65) Prior Publication Data
US 2017/0260388 A1 Sep. 14, 2017

(30) Foreign Application Priority Data
May 9, 2014 (EP) .................................... 14167689

(51) Int. Cl.
C08L 67/02 (2006.01)
B65D 43/00 (2006.01)
B65D 75/36 (2006.01)

(52) U.S. Cl.
CPC .............. *C08L 67/02* (2013.01); *B65D 43/00* (2013.01); *B65D 75/36* (2013.01); *C08L 2201/08* (2013.01); *C08L 2203/30* (2013.01); *C08L 2205/025* (2013.01); *C08L 2205/03* (2013.01)

(58) Field of Classification Search
CPC ............... C08L 67/02; C08L 2205/025; C08L 2205/03; C08L 67/04; C08L 2203/30
See application file for complete search history.

(56) References Cited

U.S. PATENT DOCUMENTS

| 5,817,721 | A | 10/1998 | Warzelhan et al. |
| 6,018,004 | A | 1/2000 | Warzelhan et al. |
| 6,046,248 | A | 4/2000 | Warzelhan et al. |
| 6,120,895 | A | 9/2000 | Kowitz et al. |
| 6,258,924 | B1 | 7/2001 | Warzelhan et al. |
| 6,573,340 | B1 | 6/2003 | Khemani et al. |
| 9,034,945 | B2 * | 5/2015 | Siegenthaler ........... C08L 67/02 |
| | | | 523/124 |
| 9,206,311 | B2 | 12/2015 | Steinke et al. |
| 9,234,073 | B2 | 1/2016 | Siegenthaler et al. |
| 2007/0203283 | A1 | 8/2007 | Scheer |

(Continued)

FOREIGN PATENT DOCUMENTS

| EP | 488617 A2 | 6/1992 |
| EP | 1561785 A1 | 8/2005 |

(Continued)

OTHER PUBLICATIONS

U.S. Appl. No. 15/309,696, filed Nov. 8, 2016, Lehenmeier et al.
International Preliminary Examination Report (in German) for PCT/EP2015/059301 dated Apr. 1, 2016.
International Preliminary Examination Report (in German) for PCT/EP2015/059303 dated Apr. 1, 2016.
International Search Report for PCT/EP2015/059301 dated Jun. 30, 2015.
International Search Report for PCT/EP2015/059303 dated Jun. 30, 2015.

*Primary Examiner* — Michael A Salvitti
(74) *Attorney, Agent, or Firm* — Drinker Biddle & Reath LLP

(57) ABSTRACT

The present invention relates to an item produced by thermoforming, comprising:
i) from 45 to 59% by weight, based on the total weight of components i to iv, of a biodegradable polyester comprising:
  i-a) from 90 to 100 mol %, based on components i-a to i-b, of succinic acid;
  i-b) from 0 to 10 mol %, based on components i-a to i-b, of one or more $C_6$-$C_{20}$ dicarboxylic acids;
  i-c) from 98 to 102 mol %, based on components i-a to i-b, of 1,3-propanediol or 1,4-butanediol;
  i-d) from 0.05 to 1% by weight, based on components i-a to i-c, of a chain extender or branching agent;
ii) from 5 to 14% by weight, based on the total weight of components i to iv, of an aliphatic-aromatic polyester comprising:
  ii-a) from 30 to 70 mol %, based on components ii-a to ii-b, of a $C_6$-$C_{18}$-dicarboxylic acid;
  ii-b) from 30 to 70 mol %, based on components ii-a to ii-b, of terephthalic acid;
  ii-c) from 98 to 100 mol %, based on components ii-a to ii-b, of 1,3-propanediol or 1,4-butanediol;
  ii-d) from 0.05 to 1% by weight, based on components ii-a to ii-c, of a chain extender or branching agent;
iii) from 15 to 24% by weight, based on the total weight of components i to iv, of polylactic acid;
iv) from 10 to 35% by weight, based on the total weight of components i to iv, of at least one mineral filler;
where the following applies to the compounded material comprising components i to iv: the ratio of component i to component iii in the compounded material is from 2.2 to 3.2, and the MVR of the compounded material is from 1 to 10 $cm^3$/10 min in accordance with DIN EN 1133-1 of Mar. 1, 2012 (190° C., 2.16 kg).

10 Claims, No Drawings

(56) References Cited

U.S. PATENT DOCUMENTS

| | | | | |
|---|---|---|---|---|
| 2012/0135169 A1* | 5/2012 | Tangelder | ................. | C08L 3/02 |
| | | | | 428/35.2 |
| 2013/0004759 A1* | 1/2013 | Siegenthaler | ........... | C08L 67/02 |
| | | | | 428/220 |
| 2013/0005895 A1* | 1/2013 | Siegenthaler | ........... | C08L 67/02 |
| | | | | 524/451 |

FOREIGN PATENT DOCUMENTS

| | | |
|---|---|---|
| EP | 2185682 A1 | 5/2010 |
| EP | 2540779 A1 | 1/2013 |
| JP | 2008045117 A | 2/2008 |
| WO | WO-9615173 A1 | 5/1996 |
| WO | WO-9615174 A1 | 5/1996 |
| WO | WO-9615175 A1 | 5/1996 |
| WO | WO-9615176 A1 | 5/1996 |
| WO | WO-9812242 A1 | 3/1998 |
| WO | WO-2005063881 A1 | 7/2005 |
| WO | WO-2009024294 A1 | 2/2009 |
| WO | WO-2010034689 A1 | 4/2010 |
| WO | WO-2010034711 A1 | 4/2010 |
| WO | WO-2013000847 A1 | 1/2013 |

\* cited by examiner

US 9,914,832 B2

ARTICLES PRODUCED BY THERMOFORMING

CROSS-REFERENCE TO RELATED APPLICATIONS

This application is a national stage application (under 35 U.S.C. §371) of PCT/EP2015/059301, filed Apr. 29, 2015, which claims benefit of European Application No. 14167689.0, filed May 9, 2014, both of which are incorporated herein by reference in their entirety.

The present invention relates to an item produced by thermoforming, comprising:
- i) from 45 to 59% by weight, based on the total weight of components i to iv, of a biodegradable polyester comprising:
  - i-a) from 90 to 100 mol %, based on components i-a to i-b, of succinic acid;
  - i-b) from 0 to 10 mol %, based on components i-a to i-b, of one or more $C_6$-$C_{20}$ dicarboxylic acids;
  - i-c) from 98 to 102 mol %, based on components i-a to i-b, of 1,3-propanediol or 1,4-butanediol;
  - i-d) from 0.05 to 1% by weight, based on components i-a to i-c, of a chain extender or branching agent;
- ii) from 5 to 14% by weight, based on the total weight of components i to iv, of an aliphatic-aromatic polyester comprising:
  - ii-a) from 30 to 70 mol %, based on components ii-a to ii-b, of a $C_6$-$C_{18}$ dicarboxylic acid;
  - ii-b) from 30 to 70 mol %, based on components ii-a to ii-b, of terephthalic acid;
  - ii-c) from 98 to 100 mol %, based on components ii-a to ii-b, of 1,3-propanediol or 1,4-butanediol;
  - ii-d) from 0.05 to 1% by weight, based on components ii-a to ii-c, of a chain extender or branching agent;
- iii) from 15 to 24% by weight, based on the total weight of components i to iv, of polylactic acid;
- iv) from 10 to 35% by weight, based on the total weight of components i to iv, of at east one mineral filler;

where the following applies to the compounded material comprising components i to iv: the ratio of component i to component iii in the compounded material is from 2.2 to 3.2, and the MVR of the compounded material is from 1 to 10 $cm^3$/10 min in accordance with DIN EN 1133-1 of Mar. 1, 2012 (190° C., 2.16 kg).

In particular, the invention relates to an item produced by thermoforming as in the introduction, with a heat resistance (HDT-B temperature in accordance with DIN EN ISO 75-2:2004-9) of from 85 to 105° C. Heat-resistant items of this type are suitable for the production of coffee capsules, lids for hot drinks, cutlery, containers for hot contents, and microwave tableware.

U.S. Pat. No. 6,573,340 and WO 2005/063881 disclose filled biodegradable polymer mixtures which comprise a soft polymer, for example an aliphatic-aromatic polyester (PBAT) and a rigid polymer such as polylactic acid (PLA). WO 2013/000847 moreover discloses filled polymer mixtures made of polybutylene succinate (PBS) and PLA, and EP 1561785 discloses filled polymer mixtures made of PBAT, PBS, and PLA. Although the polymer mixtures disclosed in the last two documents are suitable for thermoforming, they are not suitable for applications such as coffee capsules, lids for hot drinks, or microwave tableware, because they have limited heat resistance and only moderate impact resistance.

It was therefore an object of the present invention to provide items which are produced by thermoforming and do not have the abovementioned disadvantages. A particular objective was to provide a plastic with heat resistance adequate for applications in the field of hot food and drink. A further intention was that the items have sufficiently high impact resistance to comply with the mechanical requirements applicable thereto.

Surprisingly, an item produced by thermoforming achieves the objective by comprising:
- i) from 45 to 59% by weight, preferably from 45 to 55% by weight, based on the total weight of components i to iv, of a biodegradable polyester comprising:
  - i-a) from 90 to 100 mol %, based on components i-a to i-b, of succinic acid;
  - i-b) from 0 to 10 mol %, based on components i-a to i-b, of one or more $C_6$-$C_{20}$ dicarboxylic acids;
  - i-c) from 98 to 102 mol %, based on components i-a to i-b, of 1,3-propanediol or 1,4-butanediol;
  - i-d) from 0.05 to 1% by weight, based on components i-a to i-c, of a chain extender or branching agent;
- ii) from 5 to 14% by weight, preferably from 5 to 10% by weight, based on the total weight of components i to iv, of an aliphatic-aromatic polyester comprising:
  - ii-a) from 30 to 70 mol %, based on components ii-a to ii-b, of a $C_6$-$C_{18}$ dicarboxylic acid;
  - ii-b) from 30 to 70 mol %, based on components ii-a to ii-b, of terephthalic acid;
  - ii-c) from 98 to 100 mol %, based on components ii-a to ii-b, of 1,3-propanediol or 1,4-butanediol;
  - ii-d) from 0.05 to 1% by weight, based on components ii-a to ii-c, of a chain extender or branching agent;
- iii) from 15 to 24% by weight, preferably from 15 to 20% by weight, based on the total weight of components i to iv, of polylactic acid;
- iv) from 10 to 35% by weight, preferably from 20 to 30% by weight, based on the total weight of components i to iv, of at least one mineral filler;

where the following applies to the compounded material comprising components i to iv: the ratio of component i to component iii in the compounded material is from 2.2 to 3.2, and the MVR of the compounded material is from 1 to 10 $cm^3$/10 min in accordance with DIN EN 1133-1 of Mar. 1, 2012 (190° C., 2.16 kg). The HDT-B temperature of the items produced from these compounded materials is moreover preferably from 80 to 105° C. in accordance with ISO 75-2, and at the same time the Charpy impact resistance of these items is more than 60 $kJ/m^2$, in particular from 70 to 250 $kJ/m^2$, in accordance with DIN EN 179-1/1eU:2000+Amd.A (measured at 23° C., 50% relative humidity).

The invention is described in more detail below.

The aliphatic polyesters i suitable for the invention are described in more detail in WO 2010/034711, which is expressly incorporated herein by way of reference.

The structure of polyesters i is generally as follows:
- i-a) from 90 to 100 mol %, based on components i-a to i-b, of succinic acid;
- i-b) from 0 to 10 mol %, based on components i-a to i-b, of one or more $C_6$-$C_{20}$ dicarboxylic acids;
- i-c) from 98 to 102 mol %, based on components i-a to i-b, of 1,3-propanediol or 1,4-butanediol;
- i-d) from 0.05 to 1% by weight, based on components i-a to i-c, of a chain extender or branching agent.

The polyesters i described are preferably synthesized in a direct polycondensation reaction of the individual components. The dicarboxylic acid derivatives here are reacted together with the diol in the presence of a transesterification catalyst directly to give the high-molecular-weight polycondensate. On the other hand, it is also possible to obtain the copolyester i via transesterification of polybutylene succinate (PBS) with $C_6$-$C_{20}$ dicarboxylic acids in the presence of diol. Catalysts usually used are zinc catalysts, aluminum catalysts, and in particular titanium catalysts. An advantage of titanium catalysts such as tetra(isopropyl) orthotitanate and in particular tetraisobutoxy titanate (TBOT) over the tin catalysts, antimony catalysts, cobalt catalysts, and lead catalysts often used in the literature, for example tin dioctanoate, is that any residual quantities of the catalyst or downstream product from the catalyst that remain within the product are less toxic. This is a particularly important factor in biodegradable polyesters because by way of example they pass directly into the environment in the form of composting bags or mulch films.

The succinic acid, or a mixture of the dicarboxylic acids, is generally first heated to an internal temperature of from 170 to 230° C. over a period of about 60-180 min in the presence of an excess of diol, together with the catalyst, resultant water being removed by distillation. The melt of the prepolyester thus obtained is usually condensed at an internal temperature of from 200 to 250° C. within a period of from 3 to 6 hours at reduced pressure, while the diol liberated is removed by distillation, until the desired viscosity is reached at intrinsic viscosity (IV) of from 100 to 450 mL/g, and preferably from 120 to 250 mL/g.

The polyesters i of the invention can moreover be produced by the processes described in JP 2008-45117 and EP-A 488 617. It has proven advantageous to begin by reacting components a to c to give a prepolyester with IV of from 50 to 100 mL/g, preferably from 60 to 80 mL/g, and then to react this with a chain extender i-d, for example with diisocyanates, or with epoxy-containing polymethacrylates, in a chain extension reaction to give a polyester i with IV of from 100 to 450 mL/g, preferably from 150 to 300 mL/g.

Acid component i-a used comprises from 90 to 100 mol %, based on acid components a and b, preferably from 91 to 99 mol %, and with particular preference from 92 to 98 mol %, of succinic acid. Succinic acid is accessible by a petrochemical route, or else preferably from renewable raw materials, for example as described in EP-A 2185682. EP-A 2185682 discloses a biotechnology process for the production of succinic acid and 1,4-butanediol starting from different carbohydrates, using microorganisms from the Pasteurellaceae class.

The quantity used of acid component i-b, based on acid components i-a and i-b, is from 0 to 10 mol %, preferably from 1 to 9 mol %, and with particular preference from 2 to 8 mol %.

The expression $C_6$-$C_{20}$ dicarboxylic acids b means in particular adipic acid, suberic acid, azelaic acid, sebacic acid, brassylic acid, and/or arachidonic acid. Preference is given to suberic acid, azelaic acid, sebacic acid, and/or brassylic acid. The abovementioned acids are accessible from removal raw materials. By way of example, sebacic acid is accessible from castor oil. Polyesters of this type feature excellent biodegradation performance (reference: Polym. Degr. Stab. 2004, 85, 855-863).

The dicarboxylic acids i-a and i-b can be used either in the form of free acid or in the form of ester-forming derivatives. Particular ester-forming derivatives that may be mentioned are the di-$C_1$- to $C_6$-alkyl esters, such as dimethyl-, diethyl-, di-n-propyl, diisopropyl, di-n-butyl, di-isobutyl, di-tert-butyl, di-n-pentyl-, diisopentyl or di-n-hexyl esters. It is likewise possible to use anhydrides of the dicarboxylic acids. The dicarboxylic acids or ester-forming derivatives thereof can be used here individually or in the form of a mixture.

The diols 1,3-propanediol and 1,4-butanediol are likewise accessible from renewable raw materials. It is also possible to use mixtures of the diols. 1,4-Butanediol is preferred as diol because the melting points of the resultant copolymer are higher and said copolymer exhibits better crystallization.

The ratio of the diol (component i-c) to the acids (components i-a and i-b) established at the start of the polymerization reaction is generally from 1.0:1 to 2.5:1 and preferably from 1.3:1 to 2.2:1 (diol:diacids). Excess quantities of diol are drawn off during the polymerization reaction, and the ratio obtained at the end of the polymerization reaction is therefore approximately equimolar. The expression approximately equimolar means that the diacid/diol ratio is from 0.98 to 1.00.

A general procedure uses from 0.05 to 1% by weight, preferably from 0.1 to 0.9% by weight, and with particular preference from 0.1 to 0.8% by weight, based on the total weight of components i-a to i-b, of a branching agent i-d and/or chain extender i-d' selected from the group consisting of; a polyfunctional isocyanate, isocyanurate, oxazoline, carboxylic anhydride such as maleic anhydride, epoxide (in particular an epoxy-containing poly(meth)acrylate), an at least trihydric alcohol, and an at least tribasic carboxylic acid. Suitable chain extenders d' include polyfunctional and especially difunctional isocyanates, isocyanurates, oxazolines, or epoxides.

Chain extenders and also alcohols or carboxylic acid derivatives having at least three functional groups may also be interpreted as branching agents. Particularly preferred compounds have three to six functional groups. The following may be mentioned by way of example: tartaric acid, citric acid, malic acid, trimesic acid, trimellitic acid, trimellitic anhydride, pyromellitic acid, and pyromellitic dianhydride; trimethylolpropane, trimethylolethane; pentaerythritol, polyethertriols, and glycerol. Preferred are polyols such as trimethylolpropane, pentaerythritol, and especially glycerol. By means of the components d it is possible to break down biodegradable polyesters having a structural viscosity. The rheological behavior of the melts is improved; the biodegradable polyesters are easier to process.

In general it is useful to add the branching (at least trifunctional) compounds at a relatively early point in time during the polymerization.

Examples of suitable bifunctional chain extenders are tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate, or xylylene diisocyanate, hexamethylene 1,6-diisocyanate, isophorone diisocyanate, or methylenebis (4-isocyanato-cyclohexane). Particular preference is given to isophorone diisocyanate and in particular to hexamethylene 1,6-diisocyanate.

The expression aliphatic polyesters i in particular means polyesters such as polybutylene succinate (PBS), polybutylene succinate-co-adipate (PBSA), polybutylene succinate-co-sebacate (PBSSe), polybutylene succinate-co-azelate (PBSAz), or polybutylene succinate-co-brassylate (PBSBr). The aliphatic polyesters PBS and PBSA are marketed by way of example by Showa Highpolymer as Bionolle®, and by Mitsubishi as GSPla®. WO 2010/034711 describes more recent developments.

The number-average molar mass (Mn) of the polyesters i is generally in the range from 5000 to 100 000 g/mol, in particular in the range from 10 000 to 75 000 g/mol, preferably in the range from 15 000 to 50 000 g/mol, their weight-average molar mass (Mw) being from 30 000 to 300 000 g/mol, preferably from 60 000 to 200 000 g/mol, and their Mw/Mn ratio being from 1 to 6, preferably from 2 to 4. Intrinsic viscosity is from 30 to 450 g/mL, preferably from 50 to 400 g/mL (measured in o-dichlorobenzene/phenol (ratio by weight 50/50)). Melting point is in the range from 85 to 130° C., preferably in the range from 95 to 120° C. The MVR range is from 0.5 to 15 cm$^3$/10 min and preferably from 1 to 10 cm$^3$/10 min (190° C., 2.16 kg) in accordance with DIN EN 1133-1.

The expression aliphatic-aromatic polyesters ii means linear, chain-extended and preferably branched and chain-extended polyesters, as described by way of example in WO 96/15173 to 15176, or in WO 98/12242, expressly incorporated herein by way of reference. Mixtures of different semiaromatic polyesters can likewise be used. More recent developments of interest are based on renewable raw materials (see WO2010/034689). The expression polyesters ii in particular means products such as Ecoflex® (BASF SE).

Among the preferred polyesters ii are polyesters comprising, as essential components:
- ii-a) from 30 to 70 mol %, preferably from 40 to 60 mol %, and with particular preference from 50 to 60 mol %, based on components ii-a) to ii-b), of an aliphatic dicarboxylic acid or a mixture thereof, preferably as follows: adipic acid, azelaic acid, sebacic acid, and brassylic acid,
- ii-b) from 30 to 70 mol %, preferably from 40 to 60 mol %, and with particular preference from 40 to 50 mol %, based on components ii-a) and ii-b), of an aromatic dicarboxylic acid or a mixture thereof, preferably as follows: terephthalic acid,
- ii-c) from 98.5 to 100 mol %, based on components ii-a) to ii-b), of 1,4-butanediol and 1,3-propanediol; and
- ii-d) from 0.05 to 1.5% by weight, preferably from 0.1 to 0.2% by weight, based on components ii-a) to ii-c), of a chain extender, in particular of a di- or polyfunctional isocyanate, preferably hexamethylene diisocyanate, and optionally of a branching agent, preferably: trimethylolpropane, pentaerythritol, and in particular glycerol.

Aliphatic diacids and the corresponding derivatives ii-a that can be used are generally those having from 6 to 20 carbon atoms, preferably from 6 to 10 carbon atoms. They can be either linear or branched compounds. However, it is also in principle possible to use dicarboxylic acids having a larger number of carbon atoms, by way of example having up to 30 carbon atoms.

Examples that may be mentioned are: 2-methylglutaric acid, 3-methylglutaric acid, α-ketoglutaric acid, adipic acid, pimelic acid, azelaic acid, sebacic acid, brassylic acid, suberic acid, and itaconic acid. The dicarboxylic acids or ester-forming derivatives thereof can be used here individually or in the form of a mixture of two or more thereof.

It is preferable to use adipic acid, azelaic acid, sebacic acid, brassylic acid, or respective ester-forming derivatives of these, or a mixture thereof. It is particularly preferable to use adipic acid or sebacic acid, or respective ester-forming derivatives of these, or a mixture thereof.

Preference is in particular given to the following aliphatic-aromatic polyesters: polybutylene adipate terephthalate (PBAT) and polybutylene sebacate terephthalate (PBSeT).

The aromatic dicarboxylic acids ii-b or ester-forming derivatives of these can be used individually or in the form of a mixture of two or more thereof. It is particularly preferable to use terephthalic acid or its ester-forming derivatives such as dimethyl terephthalate.

The diols ii-c—1,4-butanediol and 1,3-propanediol—are accessible in the form of renewable raw material. Mixtures of the diols mentioned can also be used.

A general procedure uses from 0.05 to 1% by weight, preferably from 0.1 to 1.0% by weight, and with particular preference from 0.1 to 0.3% by weight, based on the total weight of the polyester, of a branching agent and/or from 0.05 to 1% by weight, preferably from 0.1 to 1.0% by weight, based on the total weight of the polyester, of a chain extender (ii-d). Preferred branching agents and chain extenders (ii-d) are the same as the branching agents and chain extenders (i-d) described in detail above.

The number-average molar mass (Mn) of the polyesters ii is generally in the range from 5000 to 100 000 g/mol, in particular in the range from 10 000 to 75 000 g/mol, preferably in the range from 15 000 to 38 000 g/mol, their weight-average molar mass (Mw) being from 30 000 to 300 000 g/mol, preferably from 60 000 to 200 000 g/mol, and their Mw/Mn ratio being from 1 to 6, preferably from 2 to 4. Intrinsic viscosity is from 50 to 450 g/mL, preferably from 80 to 250 g/mL (measured in o-dichlorobenzene/phenol (ratio by weight 50/50)). Melting point is in the range from 85 to 150° C., preferably in the range from 95 to 140° C.

MVR (melt volume rate) is generally from 0.5 to 8 cm$^3$/10 min, preferably from 0.8 to 6 cm$^3$/10 min, in accordance with EN ISO 1133-1 DE (190° C., 2.16 kg weight). Acid numbers are generally from 0.01 to 1.2 mg KOH/g, preferably from 0.01 to 1.0 mg KOH/g, and with particular preference from 0.01 to 0.7 mg KOH/g, in accordance with DIN EN 12634.

Polylactic acid (PLA) is used as rigid component iii.

It is preferable to use polylactic acid with the following property profile:
- melt volume rate from 0.5 to 15 cm$^3$/10 minutes, in particular from 1 to 10 cm$^3$/10 minutes (MVR for 190° C. and 2.16 kg in accordance with ISO 1133-1 DE)
- melting point below 240° C.
- glass transition temperature (Tg) above 55° C.
- water content smaller than 1000 ppm
- residual content of monomers (lactide) smaller than 0.3%
- molecular weight greater than 80 000 daltons.

Examples of preferred polylactic acids are NatureWorks® 6201 D, 6202 D, 6251 D, 3051 D, and in particular 4020 D or 4043 D, and also crystalline polylactic acids from NatureWorks.

The percentage proportion by weight used of the polylactic acid iii, based on components i and iv, is from 15 to 24%, preferably from 15 to 20%. It is preferable here that the polylactic acid iii forms the dispersed phase and that the polyester i forms the continuous phase or is part of a cocontinuous phase. The heat resistance of polymer mixtures with polyester i in the continuous phase or as part of a cocontinuous phase is higher than that of polymer mixtures in which polylactic acid iii forms the continuous phase. In order to ensure good heat resistance in the thermoformed item (HDT-B temperature from 85 to 105° C. in accordance with ISO 75-2) the ratio of component i to component iii in the compounded material from which the items are produced should be from 2.2 to 3.2, and preferably from 2.5 to 3.1.

A general procedure uses from 10 to 35% by weight, in particular from 20 to 30% by weight, and particularly preferably from 25 to 30% by weight, based on the total weight of components i to iv, of at least one mineral filler iv selected from the group consisting of: chalk, graphite, gypsum, iron oxide, calcium chloride, dolomite, kaolin, silicon dioxide (quartz), sodium carbonate, titanium dioxide, silicate, wollastonite, mica, montmorillonites, talc powder, mineral fibers, and conductive carbon black.

Particular preference is given to chalk and to talc powder as fillers. Interestingly, it has been found that addition of chalk can provide a further improvement in the biodegradability of the items. Use of talc powder can in turn be more effective in increasing modulus of elasticity and in improving heat resistance.

Mixtures of chalk and talc have proven to be particularly advantageous. A ratio of from 1:5 to 5:1 in the mixture, preferably from 1:3 to 3:1, and in particular from 1:2 to 1:1, has been found to be advantageous.

The compounded material of the invention comprising components i to iv can moreover comprise other additives known to the person skilled in the art. Examples are the additional substances conventionally used in plastics technology, for example stabilizers; nucleating agents, such as the mineral fillers iv already mentioned above, or else crystalline polylactic acid; lubricants and release agents, such as stearates (in particular calcium stearate); plasticizers, for example citric esters (in particular tributyl acetylcitrate), glycerol esters, such as triacetylglycerol, or ethylene glycol derivatives, surfactants, such as polysorbates, palmitates, or laurates; waxes, for example erucamide, stearamide, or behenamide; beeswax or beeswax esters; antistatic agents, UV absorbers; UV stabilizers; antifogging agents, or dyes. The concentrations used of the additives are from 0 to 2% by weight, in particular from 0.1 to 2% by weight, based on the compounded material i to iv of the invention. The compounded material i to iv of the invention can comprise from 0.1 to 10% by weight of plasticizers.

For the purposes of the present invention, a substance or a substance mixture complies with the "biodegradable" feature when said substance or the substance mixture has a percentage degree of biodegradation of at least 90% after 180 days in accordance with DIN EN 13432.

Biodegradability generally leads to decomposition of the polyester (mixtures) in an appropriate and demonstrable period of time. The degradation can take place by an enzymatic, hydrolytic, or oxidative route, and/or via exposure to electromagnetic radiation, for example UV radiation, and can mostly be brought about predominantly via exposure to microorganisms, such as bacteria, yeasts, fungi, and algae. Biodegradability can by way of example be quantified by mixing polyester with compost and storing the mixture for a particular time. By way of example, in accordance with DIN EN 13432 (with reference to ISO 14855), $CO_2$-free air is passed through ripened compost during the composting process, and the compost is subjected to a defined temperature profile. Biodegradability here is defined as a percentage degree of biodegradation, by taking the ratio of the net quantity of $CO_2$ released from the specimen (after subtraction of the quantity of $CO_2$ released by the compost without specimen) to the maximum quantity of $CO_2$ release from the specimen (calculated from the carbon content of the specimen). Biodegradable polyesters or biodegradable polyester mixtures generally exhibit clear signs of degradation after just a few days of composting, examples being fungal growth, cracking, and perforation.

Other methods for determining biodegradability are described by way of example in ASTM D5338 and ASTM D6400-4.

Thermoforming is a forming process for thermoplastics.

The semifinished product is supplied as flat film from a roll or as sheet product, depending on the type of plant. The films and sheets are usually produced by a single-screw extruder leading to a slot die and three-roll polishing stack.

Items made from thermoformed foils (typically 50 μm to 1 mm) in widespread use are those such as chocolate-box inserts, packaging for chocolate-covered marshmallows, games-box inserts, folding blister packs for a very wide variety of small items displayed on adjustable racking in retail outlets, and yoghurt pots and margarine tubs. Slider card blister packs, sealing caps and the folding blister packs which are difficult to open, in which small parts are often sold and which are welded by means of high-frequency (HF) electrodes, are also included. Lids for coffee cups or other cups for hot drinks are a preferred item.

Sheets from 1 to 2 mm thick are processed for sorting trays, transport trays, small load carrier (SLC) inserts or simple technical parts.

A particularly preferred item produced by thermforming is the coffee capsule. The expression coffee capsule means a pack of volume capacity from 1 ml to 80 ml, preferably from 3 to 60 ml. A pulverulent material from the food-or-drink sector, in particular coffee powder, or a mixture of pulverulent materials from the food-or-drink sector, is charged to said pack. The expression material from the food-or-drink sector means not only coffee but also tea, milk, cocoa, and soup extracts. The shape of the pack can be rotationally symmetrical, conical, spherical, or else angular, but preferably rotationally symmetrical and primarily cylindrical. Said pack serves firstly for the storage of the material(s) from the food-or-drink sector, and also for the preparation of a hot water-based drink which is produced via passage of hot water (at from 80 to 100° C.) in a subsequent step. When the water passes through the pack it dissolves substances that provide flavor and bitterness, thus forming the hot drink.

Said pack is intended to be manufactured via thermoforming. The wall thickness used here for the flat film from which the pack(s) is/are produced is from 100 to 1000 μm, preferably from 300 to 900 μm, and in particular from 400 to 800 μm. The flat film is in this case composed of one or a plurality of layer(s). At least one layer comprises the compounded material described in the introduction comprising components i) to iv). Another layer of the final molded pack preferably forms a barrier layer. The multilayer structure can be produced via coextrusion during the flat-film production process or else, after the flat-film production process, can be applied in the form of layer via extrusion, printing, spraying, or sputtering, in principle by applying a dispersion, a coating material, or any other polymer-based or polymer-containing system, or by applying a metallic or oxide-containing layer, but preferably by using a polymer-based or metalized layer. An example of a metalized layer that can be used is aluminum, and layers suitable as polymer-based layer are those comprising polyglycolic acid (PGA), polyhydroxyalkanoates (PHA), for example poly-3-hydroxybutyrate (PHB), poly-3-hydroxybutyrate-co-3-hydroxyvalerate (PHB(V)), poly-3-hydroxybutyrate-co-3-hydroxy hexanoate (PHB(H)), or poly-3-hydroxybutyrate-co-4-hydroxyvalerate; polyvinyl alcohol (PVOH), polyvinylidene chloride (PVDC), or ethylene-vinyl alcohol (EVOH). This barrier layer is characterized by an oxygen transmission rate (OTR) of from 0 to 1000 $g/m^2/d$, measured on the entire film composite after pack production in accordance with ASTM D1434, preferably by a water vapor transmission rate of from 0 to 1000 $g/m^2/d$ in accordance with ASTM F1249, and also at the same time by an aroma barrier.

The good oxygen barrier and, respectively, aroma barrier can also be achieved by means of overlap packaging for one or more coffee capsules. Suitable overlap packaging can be barrier-film-coated plastics films or paper films.

Polymer mixtures comprising components i to iv that are suitable for the thermoforming are in particular those with MVR (190° C., 2.16 kg) of from 1 to 10 cm³/10 min in accordance with ISO 1133-1 of Mar. 1, 2012, with particular preference from 2 to 6 cm³/10 min. Additionally having proven suitable in these polymer mixtures are, in particular, polyesters i and ii, which comprise from 0.05 to 1% by weight, preferably from 0.1 to 0.9% by weight, and with particular preference from 0.1 to 0.3% by weight, based on components i-a to i-c or ii-a to ii-c, respectively, of a branching agent. Polyols such as pentaerythritol or glycerol have proven particularly suitable branching agents. Lastly having proven suitable in these polymer mixtures are, in particular, polyesters i and ii which comprise from 0.05 to 1% by weight, preferably from 0.01 to 0.9% by weight, and with particular preference from 0.1 to 0.8% by weight, based on components i-a to i-c or ii-a to ii-c, respectively, of a chain extender. Hexamethylene diisocyanate has proven a particularly suitable chain extender.

Performance-Related Tests:

The molecular weights Mn and Mw of the semiaromatic polyesters were determined by means of SEC in accordance with DIN 55672-1: eluent hexafluoroisopropanol (HFIP)+ 0.05% by weight calcium trifluoroacetate; narrowly distributed polymethyl methacrylate standards were used for calibration.

Intrinsic viscosities were determined in accordance with DIN 53728 part 3, Jan. 3, 1985, Capillary viscosimetry. An M-II micro-Ubbelohde viscosimeter was used. Solvent used was the mixture: phenol/o-dichlorobenzene in a ratio of 50/50 by weight.

The modulus of elasticity was determined by means of a tensile test on tensile specimens of thickness about 420 μm in accordance with ISO 527-3: 2003.

Charpy impact resistance was determined in accordance with DIN EN 179-1/1eU:2000+Amd.A (at 23° C., 50% rel. humidity), The test sample (80 mm×10 mm×4 mm), in the form of horizontal bar supported close to its ends, is subjected to a single impact of a pendulum, the impact line being central between the two test sample supports, and the velocity of bending (of the test sample) being high and nominally constant (2.9 or 3.8 m/s). HDT-B heat resistance was determined in accordance with ISO 75-2:2004. A standard test sample is subjected to three-point bending under constant load so as to produce a flexural stress (HDT/B 0.45 MPa) stated in the relevant part of said international standard. The temperature is increased at uniform rate (120 K/h), and the temperature value measured is that at which a defined standard deflection is reached, corresponding to the defined increased in flexural strain (0.2%).

1. Starting Materials

Polyester i:

i-1 Polybutylene succinate: GS-Pla® FZ91-PD from Mitsubishi Chemical Corporation (MVR 5 cm³/10 min (190° C., 2.16 kg))

Polyester ii:

ii-1 Polybutylene sebacate-co-terephthalate: Ecoflex® FS A1100 from BASF SE (MVR 2.5 cm³/10 min (190° C., 2.16 kg))

Component iii:

iii-1 Polylactic acid (PLA) Ingeo® 4043D from NatureWorks (MVR 2.5 cm³/10 min (190° C., 2.16 kg))

Component iv:

iv-1 Talc IT extra from Mondo Minerals

2. Compounding

The compounding materials listed in Table 1 were manufactured in a Coperion MC 40 extruder. The discharge temperatures were set at 250° C. The extrudate was then pelletized under water. After production of the pellets, a flat film with a thickness of 0.8 mm was produced. The processing temperatures were adjusted to 190° C. melt temperature.

3. Production of the Items (General Specification GS)

A semiautomatic Illig UA100/4 thermoforming machine was used here. The heating power of 27.4 kW was generated via a lower and an upper ceramic source. The forming process used vacuum. A wooden cup mold with a basal diameter of 67.0 mm, a height of 72.0 mm, and an upper diameter of 55.0 mm was used for the experiments. The radius of the edge of the cup was about 8.0 mm.

TABLE 1 items produced via GS:

| | Example | | | |
|---|---|---|---|---|
| | Comparative example 1 | 2 | 3 | Comparative example 4 |
| Compounds (figures in percent by weight) | | | | |
| i-1 | 41.25 | 45 | 48.75 | 52.5 |
| ii-1 | 15 | 10 | 5 | 0 |
| iii-1 | 13.75 | 15 | 16.25 | 17.5 |
| iv-1 | 30 | 30 | 30 | 30 |
| Items produced via GS | | | | |
| Elasticity modulus (MPa) | | 2700 | | |
| Charpy (kJ/m²) | 82.3 | 65.6 | 60.1 | 40.8 |
| HDT/B (° C.) | 82.3 | 92.8 | 94.2 | 98.5 |
| MVR (cm³/10 min) | 3 | 3 | 4 | 4 |

Examples 2 and 3 in table 1 show much-improved impact resistance over thermoformed items (comparative example 4) containing no aliphatic-aromatic polyester ii-1. The good heat resistance is maintained at the same time (HDT/B). But in comparative example 1, containing 15% by weight of aliphatic-aromatic polyester ii-1, heat resistance drops to below 85° C.

The invention claimed is:

1. An item produced by thermoforming, comprising:
 i) from 45 to 59% by weight, based on the total weight of components i to iv, of a biodegradable polyester comprising:
  i-a) from 90 to 100 mol %, based on components a to b of succinic acid;
  i-b) from 0 to 10 mol %, based on components a to b, or one or more $C_6$-$C_{20}$ dicarboxylic acids;
  i-c) from 98 to 102 mol %, based on components a to b, of 1,3-propanediol or 1,4-butanediol;
  i-d) from 0.05 to 1% by weight, based on components a to c, of a chain extender or branching agent;
 ii) from 5 to 14% by weight, based on the total weight of components i to iv, of an aliphatic-aromatic polyester comprising:
  ii-a) from 30 to 70 mol %, based on components ii-a to of a $C_6$-$C_{18}$-dicarboxylic acid;
  ii-b) from 30 to 70 mol %, based on components ii-a to ii-b, of terephthalic acid;
  ii-c) from 98 to 100 mol %, based on components ii-a to ii-b, of 1,3-propanediol or 1,4-butanediol;
  ii-d) from 0.05 to 1% by weight, based on components a to c, of a chain extender or branching agent;

iii) from 15 to 24% by weight, based on the total weight of components i to iv, of polylactic acid;
iv) from 10 to 35% by weight, based on the total weight of components i to iv, of at least one mineral filler;
where the following applies to the compounded material comprising components i to iv:
the ratio of component i to component iii in the compounded material is from 2.2 to 3.2, and the MVR of the compounded material is from 1 to 10 cm$^3$/10 min in accordance with DIN EN 1133-1 of Mar. 1, 2012 (190° C., 2.16 kg).

2. The item according to claim 1, where the ratio of component i to component iii is from 2.5 to 3.1.

3. The item according to claim 1, where the MVR of polyester i is from 1 to 10 cm$^3$/10 min in accordance with DIN EN 1133-1 of Mar. 1, 2012 (190° C., 2.16 kg).

4. The item according to claim 1, where the MVR of polyester ii is from 0.8 to 6 cm$^3$/10 min in accordance with DIN EN 1133-1 of Mar. 1, 2012 (190° C., 2.16 kg).

5. The item according to claim 1, where the MVR of polyester iii is from 1 to 10 cm$^3$/10 min in accordance with DIN EN 1133-1 of Mar. 1, 2012 (190° C., 2.16 kg).

6. The item according to claim 1, which comprises at least 20% by weight of a mineral filler iv, based on the total weight of components i to iv.

7. The item according to claim 5 where the filler iv is talc powder.

8. The item according to claim 1 with HDT-B temperature of from 85 to 105° C. in accordance with DIN EN ISO 75-2:2004-9.

9. A microwave tableware which comprises the item according to claim 1.

10. A lid of cup for hot drinks which comprises the item according to claim 1.

* * * * *